UNITED STATES PATENT OFFICE.

JANE B. NEWKIRK, OF LA PORTE, INDIANA.

MILK-SKIMMING DEVICE.

SPECIFICATION forming part of Letters Patent No. 578,259, dated March 2, 1897.

Application filed June 6, 1896. Serial No. 594,517. (No model.)

*To all whom it may concern:*

Be it known that I, JANE B. NEWKIRK, a citizen of the United States, residing at La Porte, in the county of La Porte and State of Indiana, have invented certain new and useful Improvements in Milk-Skimming Devices; and I do hereby declare the following to be a full, clear, and exact description of the invention, such as will enable others skilled in the art to which it appertains to make and use the same.

My invention relates to improvements in milk-skimming devices; and one object of my invention is the provision of a skimming device which will thoroughly skim or separate the cream from the milk, which can be used in connection with a milk can or bowl, which can be operated by any one, and which is extremely simple, durable, and inexpensive, and also useful and practical.

Another object of my invention is the provision of a skimmer which is placed in the receptacle before the milk is poured in or after it has been poured in the receptacle and which when raised near the top of the milk after the cream has been allowed to rise to the top can be operated so as to remove the cream and leave the milk in the receptacle.

To attain the desired objects, the invention consists of a skimming device which embodies novel features of construction and combination of parts, substantially as disclosed herein.

The figure represents a perspective view of the device with the parts in the position they appear when placing the device in the body of milk before the skimming operation.

In the drawing, A designates the disk or plate, which has its sides or edges B flaring, so as to closely fit the sides of the milk-receptacle, although I would have it understood that the sides may be straight, and which also has formed in its bottom C the openings D, which allow the milk to pass freely through the disk, so as to allow the device to be easily lowered to the bottom of the receptacle, and the opening E, in which is secured the hollow tube F by means of the flanged end or by means of a nut screwed on this end, and at its other end it is formed with the funnel-shaped handle H, which is also made hollow, so as to allow the atmosphere to freely pass through the tube, so that the device may be easily lowered or raised in the milk, and also so that the tube may be easily and thoroughly cleaned.

Secured near the end of the hollow tube above the bottom of the disk is the spring J, having the nuts K and L placed one above and the other below, so as to be adjusted to give tension to the spring and also secure the hollow tube or staff more securely to the disk, and secured on the end of the spring J are valves or disks M, which are adapted to fit over the openings D when the cream is being removed from the surface of the milk, and these valves are removed from over the openings by simply turning the staff, and to limit the movement of the spring in either direction I employ the pins, stops, or projections N, which are secured on the bottom of the disk.

From the foregoing description, taken in connection with the drawing, the operation of my device is readily understood, and, briefly stated, is as follows: The valves are removed from over the openings in the disk and the device is lowered into the milk-receptacle and is allowed to stay in the milk until the cream has risen to the surface of the milk, when the device is raised until about even with the surface of the milk and just below the cream, when the valves are turned by means of the staff or tube until they close the openings, thus excluding the milk from the disk and retaining the cream in the disk, and then the device is raised entirely out of the receptacle.

It is now evident that I provide a skimming device which is very simple, durable, and inexpensive, and which can be used by any one, thus rendering it useful and practical.

2. A skimming device consisting of the (No Model.)
J. B. NEWKIRK.
MILK SKIMMING DEVICE.
No. 578,259. Patented Mar. 2, 1897.
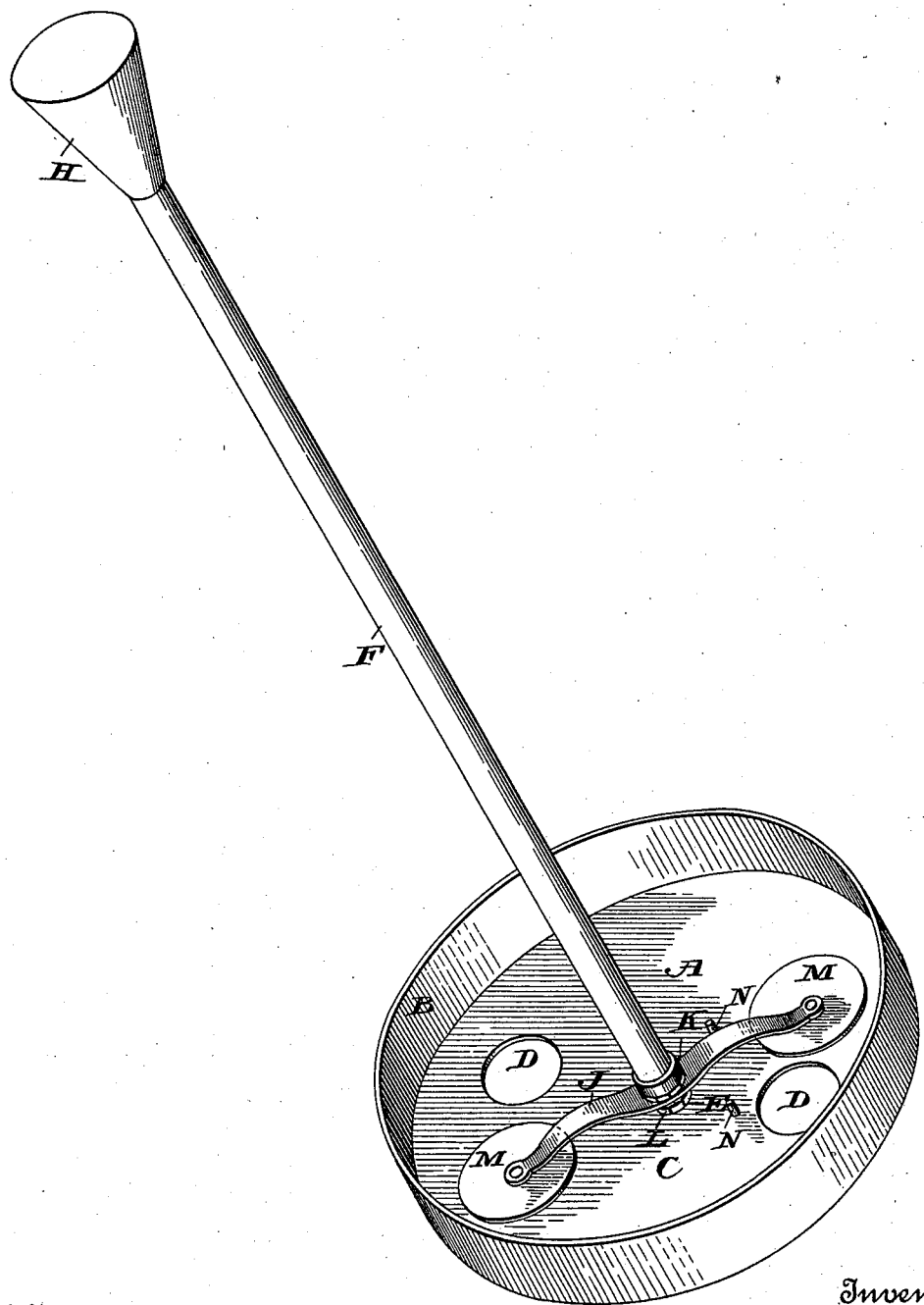

I claim—

1. A skimming device consisting of the casing having the openings arranged in line and on each side of the center of the casing, the valves for controlling the openings, the spring for pressing the valves down, and the handle connected with the casing and valves and operating in the manner described.